(12) United States Patent
Kishi

(10) Patent No.: US 7,877,544 B2
(45) Date of Patent: Jan. 25, 2011

(54) STORING REDUNDANT SEGMENTS AND PARITY INFORMATION FOR SEGMENTED LOGICAL VOLUMES

(75) Inventor: Gregory Tad Kishi, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 622 days.

(21) Appl. No.: 11/841,611

(22) Filed: Aug. 20, 2007

(65) Prior Publication Data

US 2009/0055583 A1 Feb. 26, 2009

(51) Int. Cl.
*G06F 12/00* (2006.01)
*G06F 13/00* (2006.01)
*G06F 13/28* (2006.01)

(52) U.S. Cl. .................................................... 711/114
(58) Field of Classification Search ........................ None
See application file for complete search history.

(56) References Cited

U.S. PATENT DOCUMENTS

| | | | | |
|---|---|---|---|---|
| 5,502,811 | A | * | 3/1996 | Ripberger ........................ 714/6 |
| 5,911,148 | A | * | 6/1999 | Anglin et al. ................ 711/111 |
| 6,003,115 | A | | 12/1999 | Spear et al. |
| 6,256,706 | B1 | | 7/2001 | Carlson et al. |
| 6,453,383 | B1 | | 9/2002 | Stoddard et al. |
| 6,532,548 | B1 | | 3/2003 | Hughes |
| 6,597,883 | B2 | | 7/2003 | Muramatsu et al. |
| 6,704,842 | B1 | | 3/2004 | Janakiraman et al. |
| 6,816,957 | B1 | | 11/2004 | Halladay et al. |
| 6,978,324 | B1 | | 12/2005 | Black |
| 7,000,143 | B2 | | 2/2006 | Moulton et al. |
| 2003/0028831 | A1 | | 2/2003 | Bickers et al. |
| 2004/0034736 | A1 | | 2/2004 | Horn |
| 2004/0044851 | A1 | | 3/2004 | Dawson et al. |
| 2004/0044853 | A1 | | 3/2004 | Gibble et al. |
| 2004/0044862 | A1 | | 3/2004 | Carlson et al. |
| 2004/0205298 | A1 | | 10/2004 | Bearden et al. |

(Continued)

FOREIGN PATENT DOCUMENTS

EP 1202159 A 5/2002

(Continued)

OTHER PUBLICATIONS

US Patent Application entitled "Segmentation of Logical Volumes", Serial No. unknown, Filing Date Aug. 20, 2007, by inventors T.W. Bish, G.T. Kishi and J.W. Peake.

(Continued)

*Primary Examiner*—Kevin L Ellis
*Assistant Examiner*—Chad L Davidson
(74) *Attorney, Agent, or Firm*—Rabindranath Dutta; Konrad Raynes & Victor LLP

(57) ABSTRACT

Provided are a method, system, and article of manufacture, wherein a storage manager application implemented in a first computational device maintains a virtual logical volume that has a plurality of segments created by the storage manager application. At least one additional copy of at least one of the plurality of segments is maintained in at least one linear storage medium of a secondary storage. A request for data is received, at the first computational device, from a second computational device. At least one of the plurality of segments and the at least one additional copy are used to respond to the received request for data.

20 Claims, 7 Drawing Sheets

U.S. PATENT DOCUMENTS

| | | |
|---|---|---|
| 2004/0250043 A1 | 12/2004 | Ripberger et al. |
| 2005/0050263 A1 | 3/2005 | Ashton et al. |
| 2006/0023357 A1 | 2/2006 | Deckers et al. |
| 2006/0031656 A1 | 2/2006 | Carlson et al. |
| 2006/0136771 A1 | 6/2006 | Watanabe |
| 2006/0149898 A1 | 7/2006 | Bello et al. |
| 2008/0040540 A1 | 2/2008 | Cavallo |

FOREIGN PATENT DOCUMENTS

| | | |
|---|---|---|
| WO | 2005101182 A | 10/2005 |

OTHER PUBLICATIONS

US Patent Application entitled "Maintaining Reserved Free Space for Segmented Logical Volumes", Serial No. unknown, Filing Date Aug. 20, 2007, by inventors G.T. Kishi and J.M. Swingler.

PCT International Search Report and Written Opinion dated Dec. 5, 2008 for Application No. PCT/EP2008/060272 filed Aug. 5, 2008.

Article 19 amendment for PCT Application No. PCT/EP2008/060272 filed Aug. 5, 2008.

\* cited by examiner

US 7,877,544 B2

STORING REDUNDANT SEGMENTS AND PARITY INFORMATION FOR SEGMENTED LOGICAL VOLUMES

BACKGROUND

1. Field

The disclosure relates to a method, system, and article of manufacture for storing redundant segments and parity information for segmented logical volumes.

2. Background

In certain virtual tape storage systems, hard disk drive storage may be used to emulate tape drives and tape cartridges. For instance, host systems may perform input/output (I/O) operations with respect to a tape library by performing I/O operations with respect to a set of hard disk drives that emulate the tape library. In certain virtual tape storage systems at least one virtual tape server (VTS) is coupled to a tape library comprising numerous tape drives and tape cartridges. The VTS is also coupled to a direct access storage device (DASD), comprised of numerous interconnected hard disk drives.

The DASD functions as a cache to volumes in the tape library. In VTS operations, the VTS processes the host's requests to access a volume in the tape library and returns data for such requests, if possible, from the cache. If the volume is not in the cache, then the VTS recalls the volume from the tape library to the cache, i.e., the VTS transfers data from the tape library to the cache. The VTS can respond to host requests for volumes that are present in the cache substantially faster than requests for volumes that have to be recalled from the tape library to the cache. However, since the capacity of the cache is relatively small when compared to the capacity of the tape library, not all volumes can be kept in the cache. Hence, the VTS may migrate volumes from the cache to the tape library, i.e., the VTS may transfer data from the cache to the tape cartridges in the tape library.

SUMMARY OF THE PREFERRED EMBODIMENTS

Provided are a method, system, and article of manufacture, wherein a storage manager application implemented in a first computational device maintains a virtual logical volume that has a plurality of segments created by the storage manager application. At least one additional copy of at least one of the plurality of segments is maintained in at least one linear storage medium of a secondary storage. A request for data is received, at the first computational device, from a second computational device. At least one of the plurality of segments and the at least one additional copy are used to respond to the received request for data.

In further embodiments, parity information is maintained in association with the plurality of segments. The parity information is used, in addition to the at least one of the plurality of segments and the at least one additional copy, to respond to the request for data.

In yet further embodiments, the parity information of a group of segments of the plurality of segments is stored in a separate segment.

In additional embodiments, recall efficiency for the data is increased by maintaining the at least one additional copy of the at least one of the plurality of segments in the at least one linear storage medium of the secondary storage.

In yet additional embodiments, the first computational device is a virtual tape server and the second computational device is a host, wherein a cache storage coupled to the virtual tape server is implemented in a disk device, wherein a secondary storage coupled to the virtual tape server is implemented in a tape device, and wherein the linear storage medium is a tape in the tape device.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Handling Logical Volumes a Single Entity

In certain VTS systems, logical volumes are handled as a single entity. However, when the size of physical volumes corresponding to logical volumes becomes very large, such as in Linear Tape Open (LTO) drives, all data included in logical volumes may not be accommodated at the same time in the cache storage. Additionally, transfer operations of large logical volumes from the secondary storage to the cache storage may take a significantly greater amount of time in comparison to small logical volumes. The recall times for data may become excessively large in situations where logical volumes are handled as a single entity for transfer to the cache storage from the secondary storage in a VTS environment.

Exemplary Embodiments

Certain embodiments provide for the segmentation of virtual logical volumes in a VTS environment comprising a VTS that is coupled to a cache storage and a secondary storage, wherein the segmented virtual logical volumes are used to respond to data requests from a host. In certain embodiments the segments corresponding to the virtual logical volume are distributed among a plurality of tapes, wherein redundant segments are also stored in at least one or more of the plurality of tapes for recall efficiency, and wherein parity segments may also be stored in at least one or more of the plurality of tapes for further data redundancy. If a recall of a segmented virtual logical volume fails because of bad data on a certain tape, then the redundant and/or parity segments stored in one or more other tapes may be used for data recovery. It should be noted that by distributing segments corresponding to the virtual logical volume in a plurality of tapes, by storing additional copies of segments, and by storing parity data, both recall efficiency and data redundancy may be achieved. In certain embodiments fully redundant write of data segments onto tape is not performed. In such embodiments, parity provides the data protection redundancy, whereas the redundant segments provide recall efficiency by permitting fewer tapes to be mounted for responding to a request for data.

Figure 1:
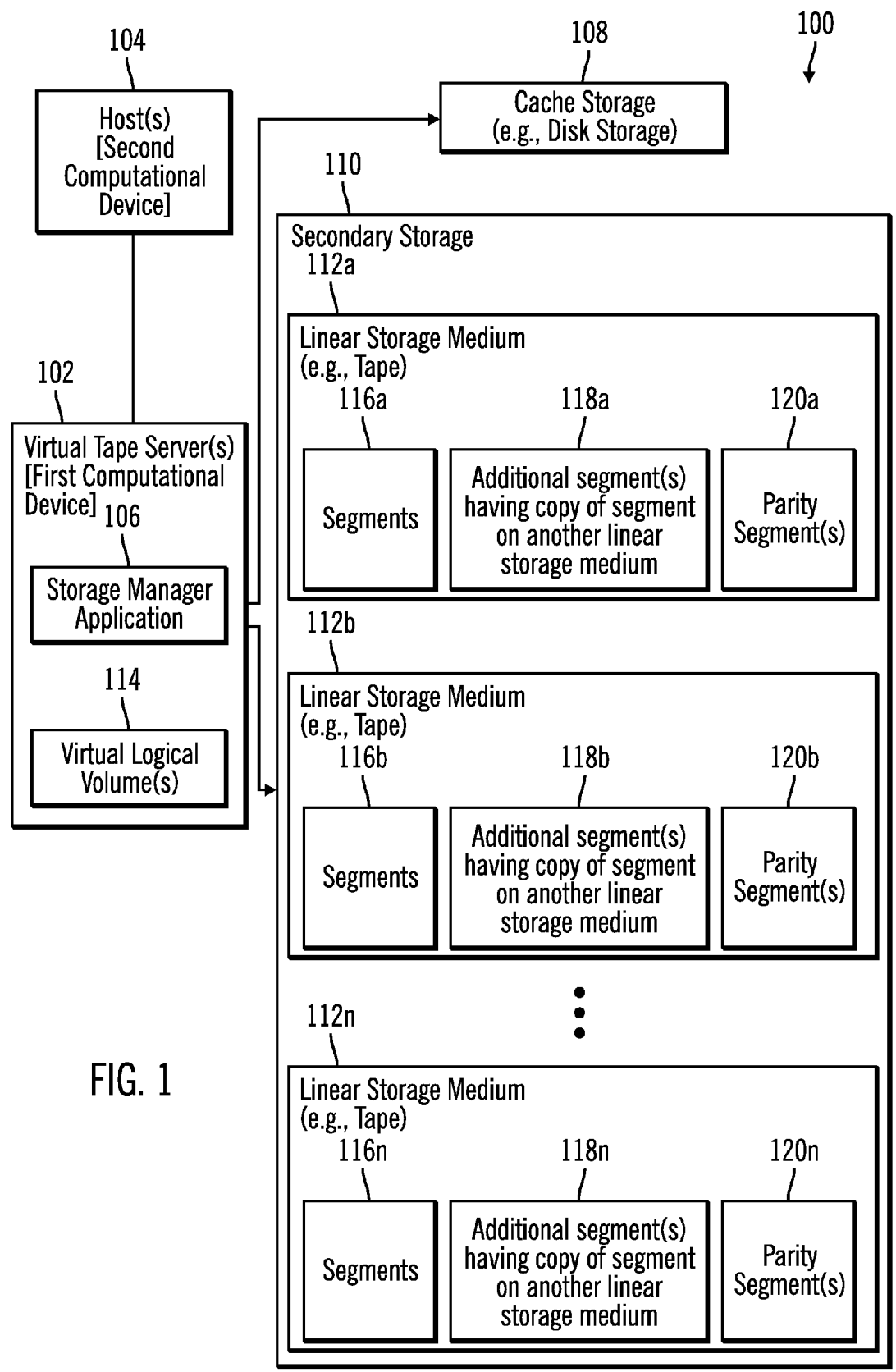
FIG. 1 illustrates a block diagram of a computing environment, in accordance with certain embodiments.

FIG. 1 illustrates a block diagram of a computing environment 100, in accordance with certain embodiments. The computing environment 100 includes a VTS 102. Additional VTSs can be deployed, but for purposes of illustration, a single VTS 102 is shown. In certain exemplary embodiments the VTS 102 may comprise a server computational device and may include any operating system known in the art. However, in alternative embodiments the VTS 102 may comprise any suitable computational device, such as a personal computer, a workstation, mainframe, a hand held computer, a palm top computer, a telephony device, network appliance, etc. The VTS 102 may be referred to as a first computational device 102.

The computing environment 100 also includes a host 104 that is coupled to the VTS 102. Additional hosts may be deployed, but for purposes of illustration, a single host 104 is shown. The host 104 may be may coupled to the VTS 102 through a host data interface channel or any other direct connection or switching mechanism, known in the art (e.g., fibre channel, Storage Area Network (SAN) interconnections, etc.). The host 104 may be any suitable computational device known in the art, such as a personal computer, a workstation, a server, a mainframe, a hand held computer, a palm top computer, a telephony device, network appliance, etc.

The VTS 102 includes at least one application, such as a storage manager application 106 that manages storage. The storage manager application 106 may be implemented either as a standalone application or as a part of one or more other applications. The storage manager application 106 manages a cache storage 108, such as a disk based storage system, and a secondary storage 110 comprising a plurality of linear storage media 112a, 112b, . . . , 112n, wherein in certain embodiments the linear storage media may comprise tapes.

The cache storage 108 and the secondary storage 110 are coupled to the VTS 102 via a direct connection or via a network connection. The cache storage 108 improves performance by allowing host I/O requests from the hosts 104 to the secondary storage 110 to be serviced from the faster access cache storage 108 as opposed to the slower access secondary storage 110. The disks in the cache storage 108 may be arranged as a Direct Access Storage Device (DASD), Just a Bunch of Disks (JBOD), Redundant Array of Inexpensive Disks (RAID), etc.

The storage manager application 106 may perform or manage the data movement operations between the host 104, the cache storage 108, and the secondary storage 110. The storage manager application 106 generates virtual logical volumes 114, wherein virtual logical volumes 114 are logical representations of data stored in cache storage 108 and the secondary storage 110.

The storage manager application 106 maps the data stored in the cache storage 108 and secondary storage 110 to a plurality of virtual logical volumes 114. The hosts 104 perform I/O operations by using the virtual logical volumes 114 via the VTS 102. The storage manager application 106 maps the virtual logical volumes 114 to the linear storage media 112a . . . 112n of the secondary storage 110.

In certain embodiments, the storage manager application 106 maps segments of an exemplary virtual logical volume to corresponding segments 116a, 116b, . . . 116n in the linear storage media 112a . . . 112n, and also creates additional segments 118a, 118b, . . . 118n and parity segments 120a, 120b, . . . 120n in the linear storage media 112a . . . 112n. An additional segment stored on a linear storage medium may comprise a copy of a segment stored on another linear storage medium. For example, an additional segment 118a stored on linear storage medium 112a may in certain embodiments comprise a copy of one of the segments 116b stored in the linear storage medium 112b. A parity segment stores the parity corresponding to a plurality of segments. For example, in certain embodiments the parity segment 120a may store the parity data generated from segment 116b and 116n. While FIG. 1 shows additional segments and parity segments on each of the linear storage media 112a, 112b, 112n, in alternative embodiments one or more of the linear storage media may lack additional segments or parity segments.

In certain embodiments the storage manager application 106 implemented in the first computational device 102 maintains a virtual logical volume 114 that has a plurality of segments created by the storage manager application 106. At least one additional copy 118a of at least one of the plurality of segments is maintained in at least one linear storage medium 112a of a secondary storage 110. A request for data is received, at the first computational device 102, from a second computational device 104. At least one of the plurality of segments and the at least one additional copy 118a are used to respond to the received request for data. In further embodiments, parity information is maintained in parity segments associated with the plurality of segments in the secondary storage 110. The parity information stored in a parity segment, such as parity segment 120b, may be used, in addition to the at least one of the plurality of segments and the at least one additional copy 118a, to respond to the request for data.

Figure 2:
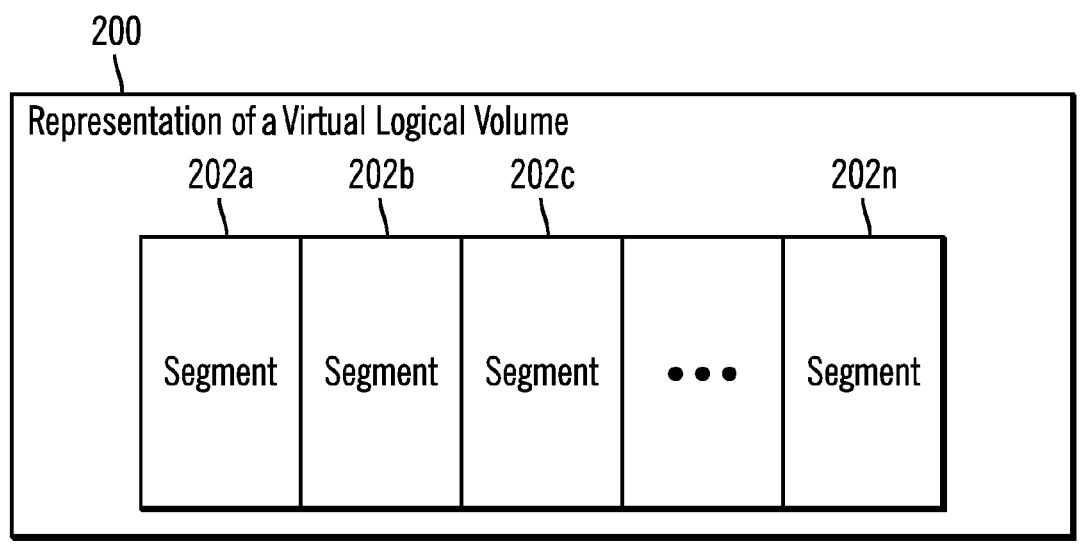
FIG. 2 illustrates a block diagram of representations of a virtual logical volume in accordance with certain embodiments.

FIG. 2 illustrates a block diagram of an exemplary representation of a virtual logical volume in accordance with certain embodiments that may be implemented in the computing environment 100.

One representation 200 of the virtual logical volume 114 of FIG. 1 may comprise a plurality of segments 202a, 202b, 202c, . . . 202n, wherein a segment is a unit of data storage. A greater or a fewer number of segments than shown in FIG. 2 may be implemented in certain embodiments.

In certain embodiments, the segments 202a, 202b, 202c, . . . , 202n of the virtual logical volumes 114 are stored in the linear storage media 112a . . . 112n of the secondary storage 110, along with the additional segments 118a . . . 118n and the parity segments 120a . . . 120n.

Figure 3:
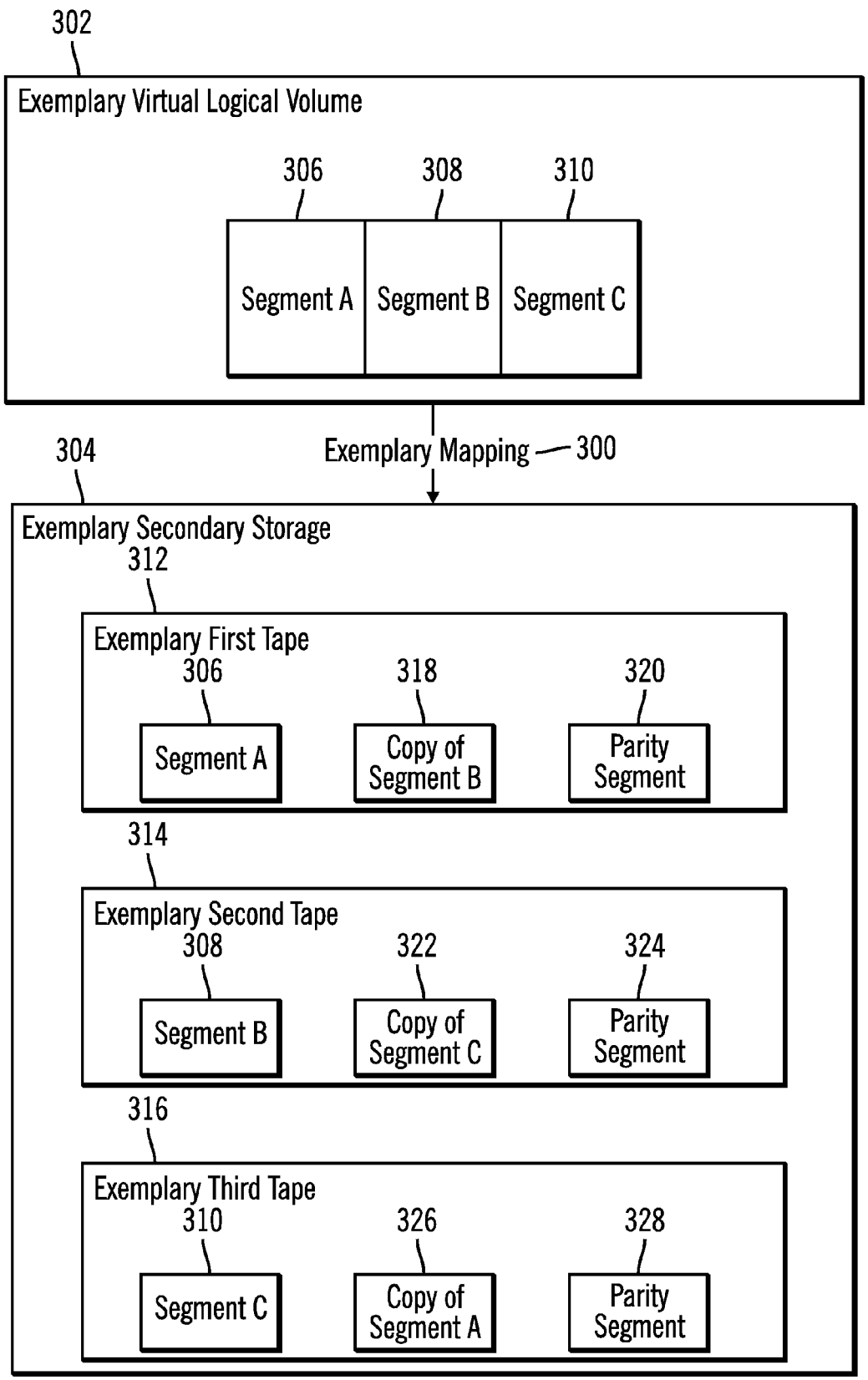
FIG. 3 illustrates a block diagram that shows a first exemplary mapping of the segments of an exemplary virtual logical volume to exemplary tapes of a secondary storage, in accordance with certain embodiments.

FIG. 3 illustrates a block diagram that shows a first exemplary mapping 300 of the segments of an exemplary virtual logical volume 302 to exemplary tapes of an exemplary secondary storage 304, in accordance with certain embodiments. The first exemplary mapping 300 is shown for illustrative purposes only and other exemplary mappings including those that are described elsewhere in this disclosure may be used in alternative embodiments.

In FIG. 3, the exemplary virtual logical volume 302 is comprised of three segments referred to as segment A 306, segment B 308, and segment C 310. In an exemplary embodiment, the three segments 306, 308, 310 are stored by the storage manager application 106 in an exemplary first tape 312, an exemplary second tape 314 and an exemplary third tape 316 as shown.

The storage manager application 106 stores in the exemplary first tape 312 the segment A 306, a copy 318 of segment B 308, and a parity segment 320 that may comprise parity data computed from some or all of the plurality of segments 306, 308, 310. The storage manager application 106 further stores in the exemplary second tape 314 the segment B 308, a copy 322 of segment C 310, and a parity segment 324 that may comprise parity data computed from some or all of the plurality of segments 306, 308, 310. The storage manager application 106 also stores in the exemplary third tape 316 the segment C 310, a copy 326 of segment A 306, and a parity segment 328 that may comprise parity data computed from some or all of the plurality of segments 306, 308, 310.

In certain embodiments one or more the exemplary tapes 312, 314, 316 may be mounted for recalling data stored in the segments 306, 308, 310 of the virtual logical volume 302. By storing additional copies 318, 322, 326 recall efficiency is increased in comparison to embodiments where additional copies are not stored in the tapes. For example, in FIG. 3, mounting any two of the three tapes 312, 314, 316 is adequate for recalling all segments 306, 308, 310 of the virtual logical volume 302 even when no parity segments are stored. Also, all segments 306, 308, 310 may be recalled by mounting the exemplary first tape 312 and the exemplary third tape 316 even when no parity segments are stored. In certain embodiments where a tape is defective, the parity segments stored in the tapes that are not defective may be used to recover data.

In FIG. 3, recall efficiency of the virtual logical volume 302 is increased by storing the copies 318, 322, 324. As a result of storing the copies 318, 322, 324, two tapes (instead of three) are adequate to recall all the segments 306, 308, 310. Additionally, even if a tape is defective, the data corresponding to the virtual logical volume 302 can be recalled from the other two tapes. The parity data provides further data protection in case of loss of a tape.

Figure 4:
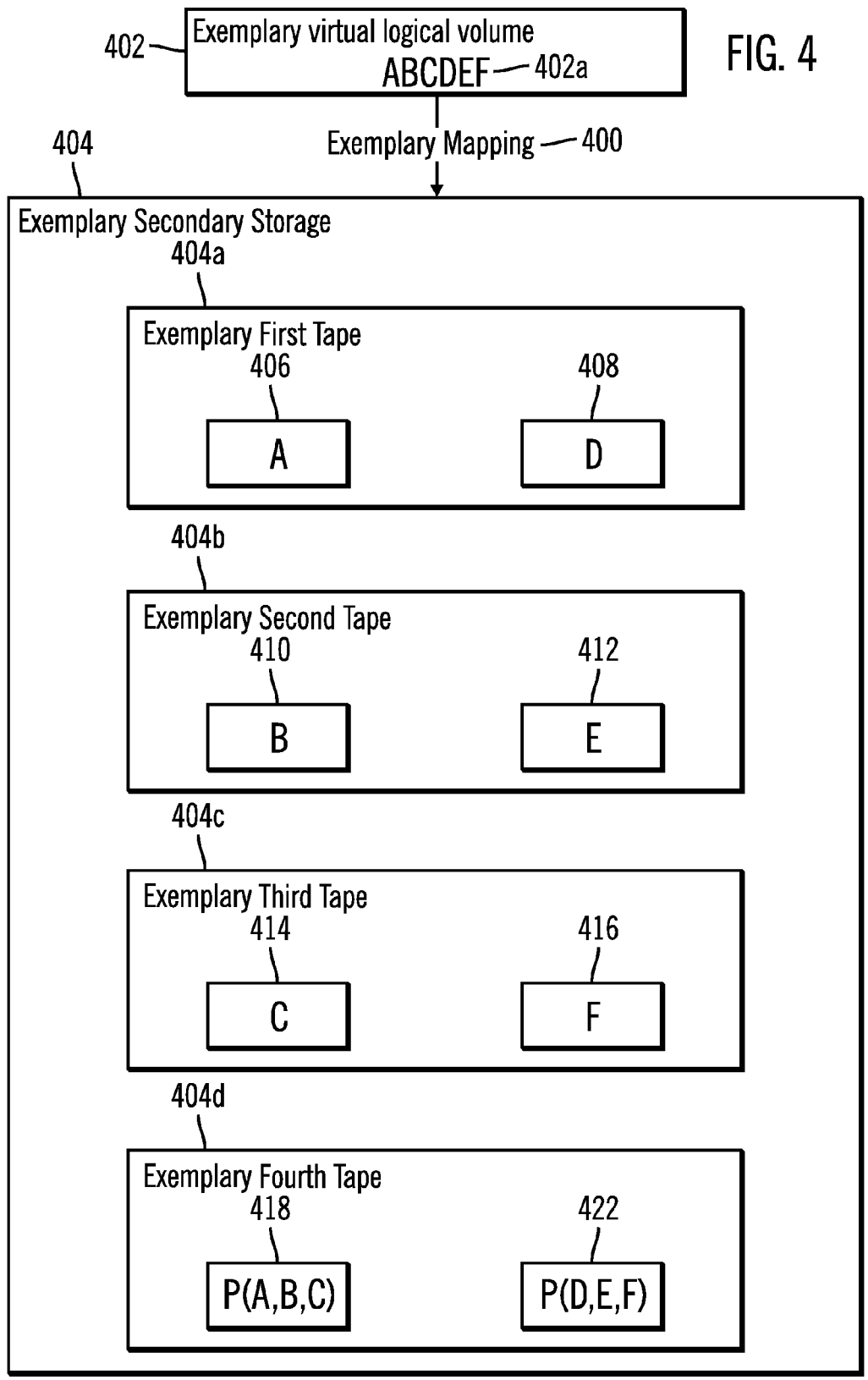
FIG. 4 illustrates a block diagram that shows a second exemplary mapping of the segments of an exemplary virtual logical volume to exemplary tapes of a secondary storage, in accordance with certain embodiments.

FIG. 4 illustrates a block diagram that shows a second exemplary mapping 400 of the segments "ABCDEF" 402a of an exemplary virtual logical volume 402 to exemplary tapes 404a, 404b, 404c, 404d of an exemplary secondary storage 404, in accordance with certain embodiments. In the second exemplary mapping 400, duplicative segments (i.e. copies of segments) are not present in the tapes.

The storage manager application 106 stores segments and parity on the tapes 404a, 404b, 404c, 404d as follows:

(1) First Tape (reference numeral 404a) stores segment A (reference numeral 406) and segment D (reference numeral 408);

(2) Second tape (reference numeral 404b) stores segment B (reference numeral 410) and segment E (reference numeral 412);

(3) Third tape (reference numeral 404c) stores segment C (reference numeral 414) and segment F (reference numeral 416); and (4) Fourth tape (reference numeral 404d) stores parity segment P(ABC) (reference numeral 418) and parity segment P(DEF) (reference numeral 420), wherein P(ABC) (reference numeral 418) is a parity segment that stores the parity data corresponding to segments A, B,C, and P(DEF) is a parity segment that stores the parity data corresponding to segments D, E, F.

The storage manager application 106 may need to mount the first tape 404a, second tape 404b, and third tape 404c to recall data corresponding to the virtual logical volume 404. The fourth tape 404d may be mounted if one of the first, second, and third tape 404a, 404b, 404c is defective.

Figure 5:
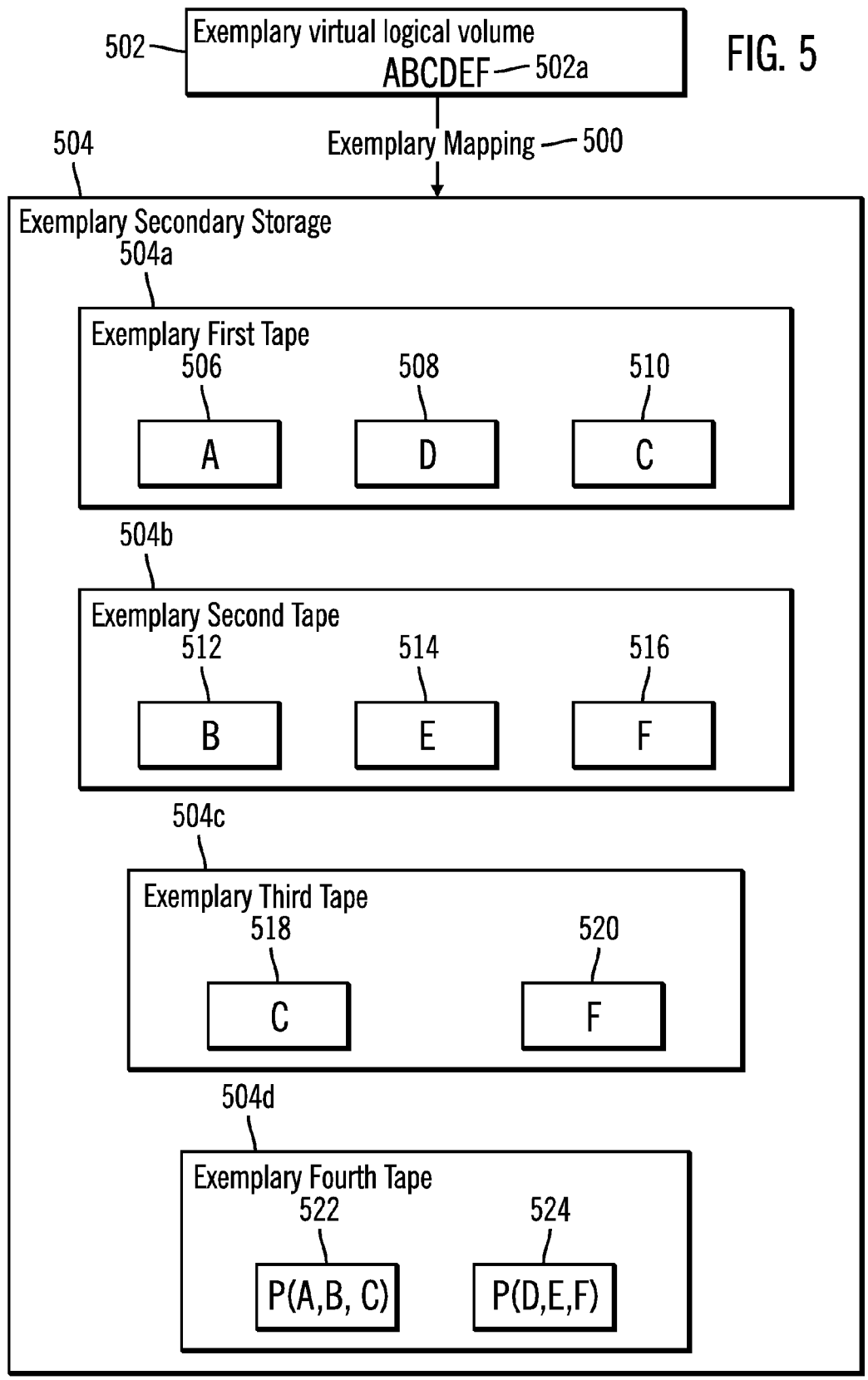
FIG. 5 illustrates a block diagram that shows a third exemplary mapping of the segments of an exemplary virtual logical volume to exemplary tapes of a secondary storage, in accordance with certain embodiments.

FIG. 5 illustrates a block diagram that shows a third exemplary mapping 500 of the segments "ABCDEF" 502a of an exemplary virtual logical volume 502 to exemplary tapes 504a, 504b, 504c, 504d of an exemplary secondary storage 504, in accordance with certain embodiments. In the second exemplary mapping 500, duplicative segments (i.e. copies of segments) are present in the tapes.

The storage manager application 106 stores segments and parity information on the tapes 504a, 504b, 504c, 504d as follows:

(1) First Tape (reference numeral 504a) stores segment A (reference numeral 506), segment D (reference numeral 508), and segment C (reference numeral 510);

(2) Second tape (reference numeral 504b) stores segment B (reference numeral 512), segment E (reference numeral 514), and segment F (reference numeral 516);

(3) Third tape (reference numeral 504c) stores segment C (reference numeral 518) and segment F (reference numeral 520); and (4) Fourth tape (reference numeral 504d) stores parity segment P(ABC) (reference numeral 522) and parity segment P(DEF) (reference numeral 524), wherein P(ABC) (reference numeral 522) is a parity segment that stores the parity data corresponding to segments A, B, C, and P(DEF) (reference numeral 524) is a parity segment that stores the parity data corresponding to segments D, E, F.

In FIG. 5, the storage manager application 106 may need to mount the first tape 504a and the second tape 504b to recall data corresponding to the virtual logical volume 404. One or more of the other tapes 504c, 504d may have to be mounted if either the first tape 504a or the second tape 504b is defective.

In the embodiment described in FIG. 5, by storing the segments of the virtual logical volume redundantly, e.g., by storing segment C is both the first tape 504a and the third tape 504c, recall efficiency is increased in comparison to the embodiment described in FIG. 4 where the segments of the virtual logical volume are not stored redundantly.

Figure 6:
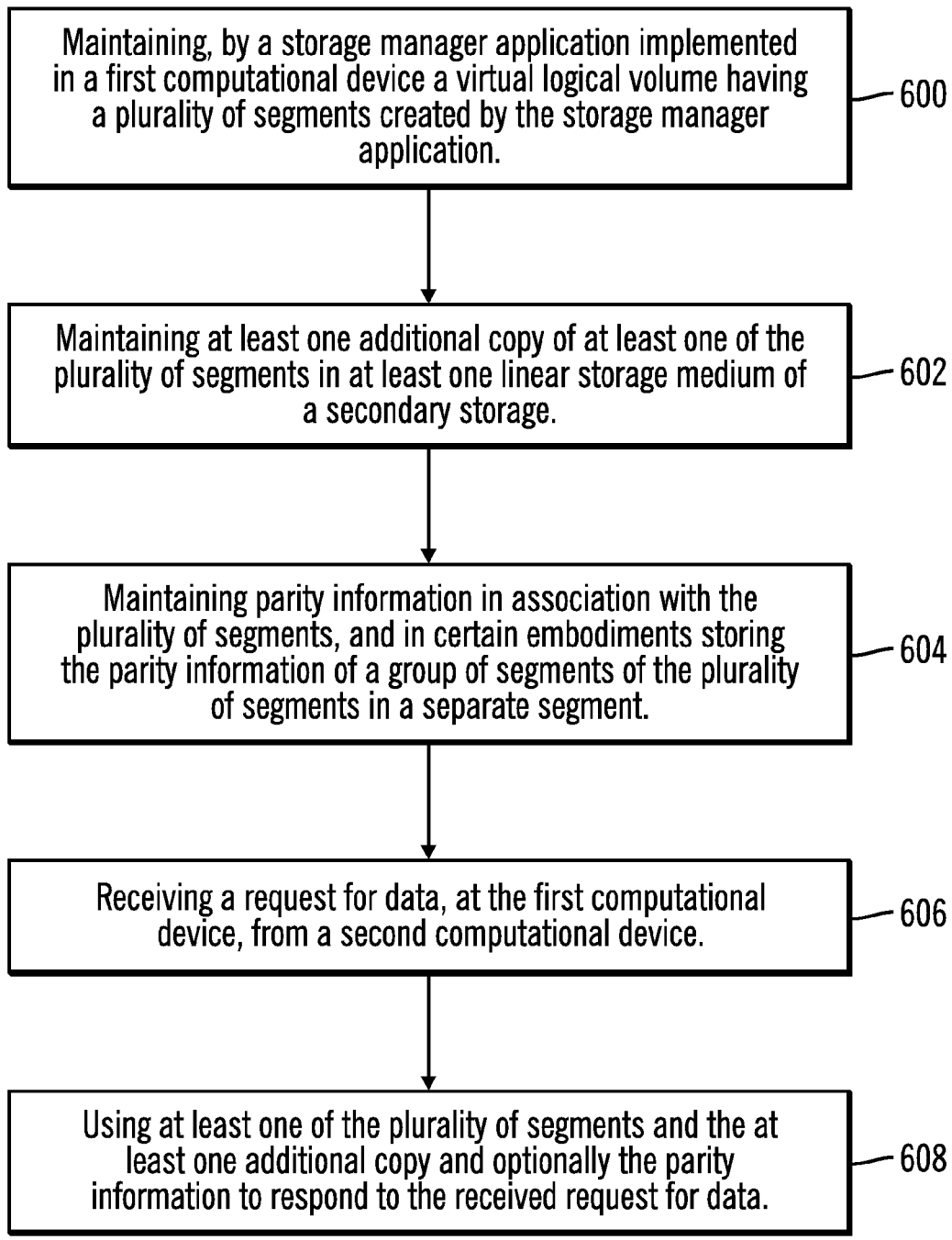
FIG. 6 illustrates operations implemented in the computing environment, in accordance with certain embodiments.

FIG. 6 illustrates operations implemented in the computing environment 100, in accordance with certain embodiments. In certain embodiments, the operations may be performed by the storage manager application 106 implemented in the first computational device 102.

Control starts at block 600, where the storage manager application 106, implemented in the first computational device 102 maintains a virtual logical volume 114 having a plurality of segments created by the storage manager application 106.

The storage manager application 106 maintains (at block 602) at least one additional copy 118a of at least one of the plurality of segments in at least one linear storage medium 112a of a secondary storage 110.

In certain embodiments, the storage manager application 106 also maintains (at block 604) parity information in association with the plurality of segments, and in certain additional embodiments the storage manager application 106 stores the parity information of a group of segments of the plurality of segments in a separate segment.

Control proceeds to block 606, where the storage manager application 106 receives a request for data corresponding to a virtual logical volume 114, at the first computational device 102. The request may have arrived at the first computational device 102 from a second computational device 104.

The storage manager application 106 uses (at block 608) at least one of the plurality of segments and the at least one additional copy 118a and optionally the parity information to respond to the received request for data.

Therefore, FIG. 6 illustrates certain embodiments wherein segments corresponding to a virtual logical volume are redundantly distributed among a plurality of linear storage media. Parity information corresponding to the segments may also be stored on one or more of linear storage media. The redundantly distributed segments provide recall efficiency because fewer linear storage media may have to be mounted to recall data. The distribution of the segments among a plurality of linear storage media and the storage of the parity information may also provide protection against loss of data on one or more linear storage media. In certain embodiments the distribution of segments may provide partial redundancy whereas in other embodiments the distribution of segments may provide complete redundancy. The parity information provides additional redundancy protection beyond that provided by the redundant distribution of segments in the plurality of linear storage media.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 7:
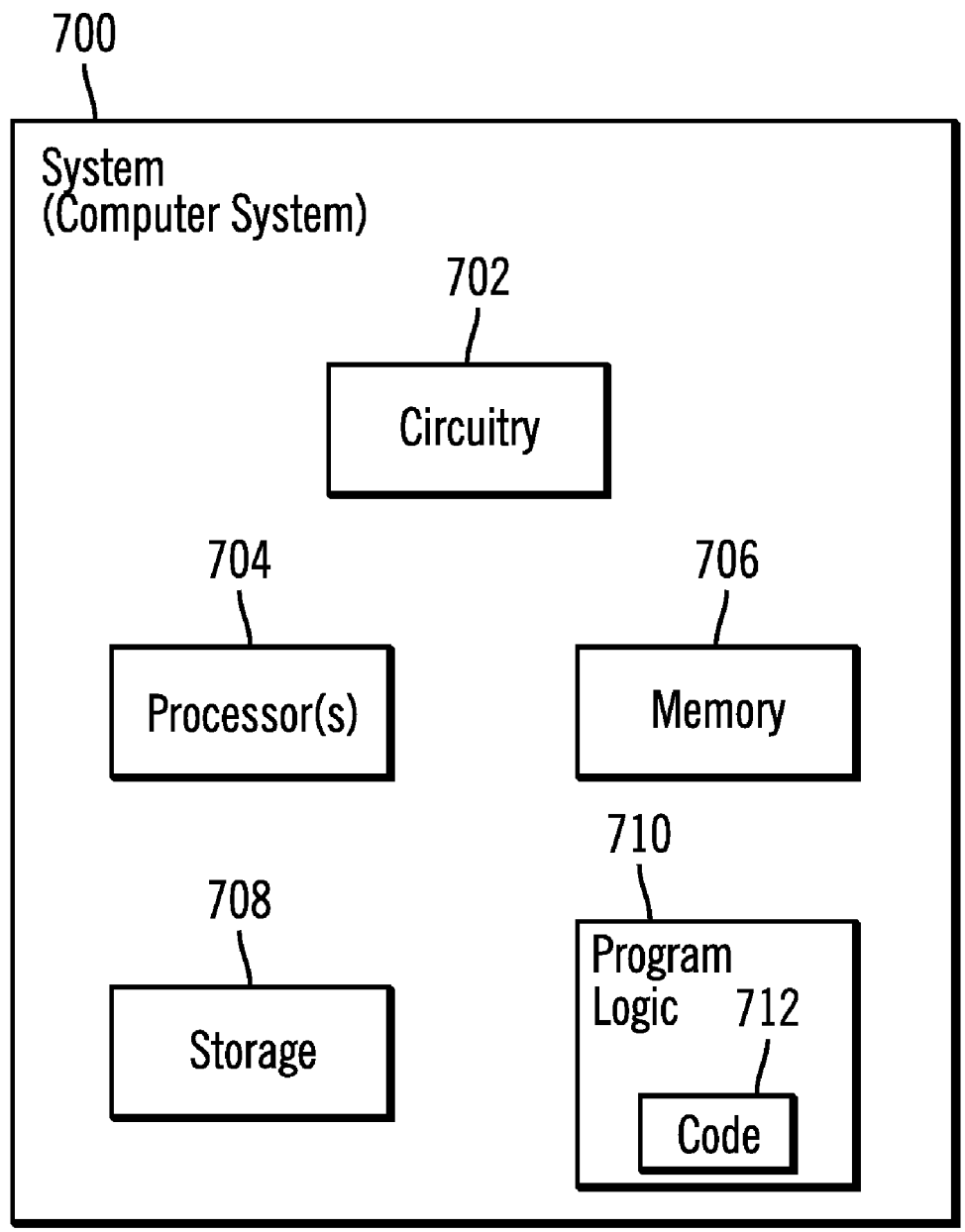
FIG. 7 illustrates a block diagram of a computer architecture in which certain described aspects of the embodiments are implemented.

FIG. 7 illustrates the architecture of computing system 700, wherein in certain embodiments the VTS 102 and the hosts 104 of the computing environments 100 of FIG. 1 may be implemented in accordance with the architecture of the computing system 700. The computing system 700 may also be referred to as a system, and may include a circuitry 702 that may in certain embodiments include a processor 704. The system 700 may also include a memory 706 (e.g., a volatile memory device), and storage 708. The storage 708 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 708 may comprise an internal storage device, an attached storage device and/or a network accessible storage device. The system 700 may include a program logic 710 including code 712 that may be loaded into the memory 706 and executed by the processor 704 or circuitry 702. In certain embodiments, the program logic 710 including code 712 may be stored in the storage 708. In certain other embodiments, the program logic 710 may be implemented in the circuitry 702. Therefore, while FIG. 7 shows the program logic 710 separately from the other elements, the program logic 710 may be implemented in the memory 706 and/or the circuitry 702.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-7 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-7 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
   maintaining, by a storage manager application implemented in a first computational device, a virtual logical volume having a plurality of segments created by the storage manager application, wherein the plurality of segments of the virtual logical volume have been stored in a secondary storage by distributing the plurality of segments in at least three linear storage mediums;
   maintaining, in at least one of the at least three linear storage mediums of the secondary storage, at least one additional copy of at least one of the stored plurality of segments;
   receiving a request for data to recall all of the plurality of segments of the virtual logical volume, at the first computational device, from a second computational device; and
   in response to receiving the request for data, mounting two of the at least three linear storage mediums, and subsequent to the mounting using at least one of the stored plurality of segments and the at least one additional copy to respond to the received request for data to recall all of the plurality of segments of the virtual logical volume.

2. The method of claim 1, further comprising:
   maintaining parity information in association with the plurality of segments;
   using the parity information, in addition to the at least one of the plurality of segments and the at least one additional copy, to respond to the request for data.

3. The method of claim 2, further comprising:
   storing the parity information of a group of segments of the plurality of segments in a separate segment.

4. The method of claim 1, wherein recall efficiency for the data is increased by maintaining the at least one additional copy of the at least one of the plurality of segments in the at least one linear storage medium of the secondary storage.

5. The method of claim 1,
   wherein the first computational device is a virtual tape server;
   wherein the second computational device is a host;
   wherein a cache storage coupled to the virtual tape server is implemented in a disk device;
   wherein the secondary storage is coupled to the virtual tape server and is implemented in a tape device; and
   wherein the linear storage medium is a tape in the tape device.

6. A system, comprising:
   a memory; and
   a processor coupled to the memory, wherein the processor performs operations, the operations comprising:
   maintaining, by a storage manager application implemented in a first computational device, a virtual logical volume having a plurality of segments created by the storage manager application, wherein the plurality of segments of the virtual logical volume have been stored in a secondary storage by distributing the plurality of segments in at least three linear storage mediums;
   maintaining, in at least one of the at least three linear storage mediums of the secondary storage, at least one additional copy of at least one of the stored plurality of segments;
   receiving a request for data to recall all of the plurality of segments of the virtual logical volume, at the first computational device, from a second computational device; and
   in response to receiving the request for data, mounting two of the at least three linear storage mediums, and subsequent to the mounting using at least one of the stored plurality of segments and the at least one additional copy to respond to the received request for data to recall all of the plurality of segments of the virtual logical volume.

7. The system of claim 6, the operations further comprising:
   maintaining parity information in association with the plurality of segments;
   using the parity information, in addition to the at least one of the plurality of segments and the at least one additional copy, to respond to the request for data.

8. The system of claim 7, the operations further comprising:
   storing the parity information of a group of segments of the plurality of segments in a separate segment.

9. The system of claim 6, wherein recall efficiency for the data is increased by maintaining the at least one additional copy of the at least one of the plurality of segments in the at least one linear storage medium of the secondary storage.

10. The system of claim 6,
wherein the first computational device is a virtual tape server;
wherein the second computational device is a host;
wherein a cache storage coupled to the virtual tape server is implemented in a disk device;
wherein the secondary storage is coupled to the virtual tape server and is implemented in a tape device; and
wherein the linear storage medium is a tape in the tape device.

11. A computer readable storage medium, wherein code stored in the computer readable storage medium when executed by a processor causes operations, the operations comprising:
maintaining, by a storage manager application implemented in a first computational device, a virtual logical volume having a plurality of segments created by the storage manager application, wherein the plurality of segments of the virtual logical volume have been stored in a secondary storage by distributing the plurality of segments in at least three linear storage mediums;
maintaining, in at least one of the at least three linear storage mediums of the secondary storage, at least one additional copy of at least one of the stored plurality of segments;
receiving a request for data to recall all of the plurality of segments of the virtual logical volume, at the first computational device, from a second computational device; and
in response to receiving the request for data, mounting two of the at least three linear storage mediums, and subsequent to the mounting using at least one of the stored plurality of segments and the at least one additional copy to respond to the received request for data to recall all of the plurality of segments of the virtual logical volume.

12. The computer readable storage medium of claim 11, the operations further comprising:
maintaining parity information in association with the plurality of segments;
using the parity information, in addition to the at least one of the plurality of segments and the at least one additional copy, to respond to the request for data.

13. The computer readable storage medium of claim 12, the operations further comprising:
storing the parity information of a group of segments of the plurality of segments in a separate segment.

14. The computer readable storage medium of claim 11, wherein recall efficiency for the data is increased by maintaining the at least one additional copy of the at least one of the plurality of segments in the at least one linear storage medium of the secondary storage.

15. The computer readable storage medium of claim 11,
wherein the first computational device is a virtual tape server;
wherein the second computational device is a host;
wherein a cache storage coupled to the virtual tape server is implemented in a disk device;
wherein the secondary storage is coupled to the virtual tape server and is implemented in a tape device; and
wherein the linear storage medium is a tape in the tape device.

16. A method for deploying computing infrastructure, comprising integrating computer-readable code into a first computational device, wherein the code in combination with the first computational device is capable of performing:
maintaining, by a storage manager application implemented in a first computational device, a virtual logical volume having a plurality of segments created by the storage manager application, wherein the plurality of segments of the virtual logical volume have been stored in a secondary storage by distributing the plurality of segments in at least three linear storage mediums;
maintaining, in at least one of the at least three linear storage mediums of the secondary storage, at least one additional copy of at least one of the stored plurality of segments;
receiving a request for data to recall all of the plurality of segments of the virtual logical volume, at the first computational device, from a second computational device; and
in response to receiving the request for data, mounting two of the at least three linear storage mediums, and subsequent to the mounting using at least one of the stored plurality of segments and the at least one additional copy to respond to the received request for data to recall all of the plurality of segments of the virtual logical volume.

17. The method for deploying computing infrastructure of claim 16, wherein the code in combination with the first computational device is further capable of performing:
maintaining parity information in association with the plurality of segments;
using the parity information, in addition to the at least one of the plurality of segments and the at least one additional copy, to respond to the request for data.

18. The method for deploying computing infrastructure of claim 17, wherein the code in combination with the first computational device is further capable of performing:
storing the parity information of a group of segments of the plurality of segments in a separate segment.

19. The method for deploying computing infrastructure of claim 16, wherein recall efficiency for the data is increased by maintaining the at least one additional copy of the at least one of the plurality of segments in the at least one linear storage medium of the secondary storage.

20. The method for deploying computing infrastructure of claim 16,
wherein the first computational device is a virtual tape server;
wherein the second computational device is a host;
wherein a cache storage coupled to the virtual tape server is implemented in a disk device;
wherein the secondary storage is coupled to the virtual tape server and is implemented in a tape device; and
wherein the linear storage medium is a tape in the tape device.

* * * * *